(12) United States Patent
Reilly

(10) Patent No.: US 9,010,046 B1
(45) Date of Patent: Apr. 21, 2015

(54) MOLDING STRIP FOR FABRIC WALLS AND CEILINGS

(71) Applicant: Novawall Systems, Inc., Alexandria, VA (US)

(72) Inventor: Rob H. Reilly, Alexandria, VA (US)

(73) Assignee: Novawell Systems, Inc., Alexandria, VA (US)

( * ) Notice: Subject to any disclaimer, the term of this patent is extended or adjusted under 35 U.S.C. 154(b) by 0 days.

(21) Appl. No.: 14/306,639

(22) Filed: Jun. 17, 2014

(51) Int. Cl.
*B44C 7/02* (2006.01)

(52) U.S. Cl.
CPC ...................................... *B44C 7/022* (2013.01)

(58) Field of Classification Search
CPC ............ E04B 9/303; E04B 2009/0492; E04B 2009/7479; E04B 2001/8263; E04F 13/005; B44C 7/022
USPC .......... 52/63, 222, 273, 287.1, 511, 843, 844, 52/506.05; 24/289, 293, 481; 160/327, 160/328, 371; 181/30, 295
See application file for complete search history.

(56) References Cited

U.S. PATENT DOCUMENTS

| | | | | |
|---|---|---|---|---|
| 3,382,639 A | * | 5/1968 | Smith et al. | ....................... 52/844 |
| 4,018,260 A | * | 4/1977 | Baslow | ........................... 160/327 |
| 4,053,008 A | * | 10/1977 | Baslow | ........................... 160/327 |
| 4,151,672 A | | 5/1979 | Lopez | |
| 4,161,977 A | | 7/1979 | Baslow | |
| 4,197,686 A | | 4/1980 | Baslow | |
| 4,426,760 A | * | 1/1984 | Watts | ........................... 29/407.1 |
| 4,625,490 A | | 12/1986 | Baslow | |
| 4,631,882 A | | 12/1986 | Sease | |
| 4,676,016 A | * | 6/1987 | Phillips et al. | ................... 40/617 |
| 4,731,960 A | | 3/1988 | Sease | |
| 4,788,806 A | * | 12/1988 | Sease | .............................. 52/222 |
| 4,920,714 A | | 5/1990 | Sease | |
| 5,029,422 A | * | 7/1991 | Scherrer | ......................... 52/222 |
| 5,117,598 A | * | 6/1992 | Livingston et al. | ............. 52/222 |
| 5,214,891 A | * | 6/1993 | Edlin | .............................. 52/222 |
| 5,214,892 A | * | 6/1993 | Livingston et al. | ............. 52/222 |
| D376,754 S | * | 12/1996 | Livingston et al. | ............ D8/377 |
| 5,904,200 A | * | 5/1999 | Agen | ............................ 160/391 |
| 5,953,873 A | * | 9/1999 | Livingston et al. | ............. 52/222 |
| 6,283,247 B1 | * | 9/2001 | McGrath et al. | ............... 181/295 |
| 2002/0194802 A1 | * | 12/2002 | Cousin | ......................... 52/287.1 |

FOREIGN PATENT DOCUMENTS

| | | | | |
|---|---|---|---|---|
| FR | 2970013 A1 | * | 7/2012 | |
| GB | 2051914 A | * | 1/1981 | .............. E04F 13/00 |
| WO | WO 9923321 A1 | * | 5/1999 | ................ E04B 1/00 |

* cited by examiner

*Primary Examiner* — Robert Canfield
(74) *Attorney, Agent, or Firm* — Whitham Curtis Christofferson & Cook, PC

(57) ABSTRACT

A molding strip for fabric and wall systems has a base for securing it to a wall and at least two pairs of flexible gripping members that face each other at fabric entry slots for different fabric receiving cavities. In one embodiment, one pair of flexible gripping walls is arranged where an edge of the base and an adjacent wall or ceiling intersect and the other pair is arranged on a protruding member. The flexible gripping walls have gripping teeth to secure the fabric after insertion of fabric into a collection cavity.

7 Claims, 3 Drawing Sheets

MOLDING STRIP FOR FABRIC WALLS AND CEILINGS

FIELD OF THE INVENTION

The invention is generally related to stretched fabric panels used for architectural and acoustic interior treatments and, more particularly, to molding strips used to secure the stretched fabric to a support surface such as a ceiling or wall,

BACKGROUND

Architectural fabric ceiling and wall systems have been used for several years to enhance interior acoustics and the appearance of interior spaces in homes, buildings, rooms, and the like. These systems can provide color, texture, and three-dimensional features to a ceiling or wall which cannot be duplicated by other surface treatments. Typically, these systems include a number of extruded molding strips which frame an area over which a fabric is stretched. The extruded molding strips, also referred to as track, are affixed to a support structure such as a wall or ceiling using screws, nails, adhesives, or other securing means as appropriate, and have a retaining mechanism for retaining the fabric. The area which is framed by the track can be any shape or size. After the track frames the area, the fabric is stretched over the frame and secured in the retaining mechanism. The fabric can be any material which can be held by the retaining mechanism. The fabric is often a cloth material, and the cloth may be textured or patterned with a design.

The retaining mechanisms which have been employed in prior art systems typically include a pair of spring biased walls which have opposing jaw members. In operation, the fabric is pushed between the jaws using a knife or other suitable flat object. The fabric accumulates in a cavity between the jaw members, and, if necessary, can be trimmed using a knife or shears at the location of the retaining mechanism after it is inserted into the cavity. Because the extruded members provide a frame for the area of interest, the procedure of stretching the fabric over the frame and stuffing the fabric into the retaining mechanism region of the frame members assures that a smooth fabric surface is presented. The framed unit is often referred to as a stretch fabric "panel".

The fabric panel may be positioned over a tackable core material, such as, for example, in wall applications where it is desired to permit pictures and other objects to be hung on the wall over the fabric panel. In addition, the fabric panel may be positioned over acoustical core materials (i.e., fibrous or foam insulation) which attenuate sound, as would be needed in auditoriums or recording studios. Furthermore, electronic equipment, such as speakers, microphones, and the like, may be positioned behind the fabric panel within a mounting frame or region.

The choice of material used for the fabric will depend on the application. In acoustic applications, it will be desirable to use loose weave materials which will allow free passage of air between the room and the sound attenuating foam or fibrous material. This will allow, in the case of embedded speakers, sound to be projected clear and undistorted into the room from the speaker, and, in the case of using acoustical cores to deaden undesirable noise, and will prevent undesirable noise from being reflected into the room. For wall or ceiling applications which are decorative in purpose, fabrics with a tighter weave and other specific characteristics will be preferred. Cloth as well as metal wire and extruded plastic fabrics can be used.

The panels need not be rectangular in shape. In fact, the edges of several adjacent fabric panels can be organized in a manner which creates parallelograms, triangles, and other geometric shapes on the treated wall surface. In addition, the extruded pieces can be fashioned so as to create bevels, curves, and spaces between adjacent panels.

Several patents describe stretch fabric panel systems. These include U.S. Pat. Nos. 4,631,882, 4,731,960, and 4,788,806 all to Sease; U.S. Pat. Nos. 4,018,260, 4,053,008, 4,151,672, 4,161,977, 4,197,686, and 4,625,490 all to Baslow; and U.S. Pat. Nos. 5,117,598, 5,214,892, and 5,953,873 all to Livingston. Each of these patents is herein incorporated by reference.

Despite the widespread use of fabric panel systems, improvements in molding strip designs for use where two surfaces meet perpendicularly would be advantageous. Most fabric panel systems can only fit into a perpendicular edge with removal of certain sections of the wall track to be inserted. This impediment of the fabric panel systems makes the installation more difficult due to an addition of steps and the increased possibility of error in the installation. In addition, prior art stretch fabric panel systems often retain opposing jaw members in an interlocking pattern or have no jaws present at all. Accordingly, there is a need for a molding system which retains the dual ability to be applied at an edge of two perpendicularly intersecting surfaces without modifying the original design, and which possesses an inward gripping teeth formation which benefits the homeowner and professional alike.

SUMMARY

An object of the present invention is to provide molding strips for fabric wall and ceiling systems which retain the dual ability of being applied at a surface or setting at an edge where two surfaces intersect perpendicularly without the need to modify the molding strip.

Pursuant to this and other objects of the present invention, a fabric panel molding has a protruding portion in a longitudinal direction and a base with a wall contact surface. There are at least two separate fabric receiving cavities, each with gripping members at a fabric tuck point, such as a first and second flexible gripping wall having gripping surfaces. In a preferred embodiment, one fabric receiving cavity (also referred to as a collection cavity) is adjacent to the base while a second fabric receiving cavity is spaced away from the base by the first cavity. Each cavity includes an entry tuck point for inserting a portion of fabric material and a gripping member for gripping the inserted fabric.

An advantageous feature of this invention is that it can be used effectively on a wall or a ceiling surface that abuts an adjacent wall or ceiling surface that does not abut against an adjacent surface. For example, when the molding strip abuts an adjacent wall or ceiling, fabric can be tucked into a collection cavity spaced away from the base, and when the molding strip does not abut an adjacent surface, fabric can be wrapped around the strip to cover it completely and be tucked into a collection cavity adjacent the base.

A variety of gripping members may be employed at the tuck points which permit fabric insertion into the collection cavities. In a preferred embodiment grip members, such as these in patent in U.S. Pat. No. 5,953,873 to Livingston which is herein incorporated by reference. In this preferred embodiment, two of the pluralities of gripping teeth are formed of two separate tooth grip surfaces substantially perpendicular to a common plane. The first and second tooth grip surfaces of each of the first and second plurality of gripping teeth form a projecting point extending longitudinally along the extrusion. The other two pluralities of gripping teeth are formed of two separate tooth grip surfaces substantially parallel to a common plane. Both sets of gripping teeth are arranged such that the point of each tooth projects into a cavity between a corresponding two teeth. In the absence of a secured fabric, the teeth may mesh with the point of one tooth contacting a second tooth grip surface in a central region or being positioned only slightly away from the second tooth grip surface. The flexible gripping walls and plurality of gripping teeth are arranged such that a fabric inserted into the fabric entry slot first contacts the angled second surface of a first of the first plurality of gripping teeth, passes over the point of the first gripping tooth, which slightly deflects the first gripping wall due to the fabric passing between the point of the first gripping tooth and the second angled surface of a first of the second plurality of teeth. The teeth configuration makes it easier to move fabric into the fabric receiving cavity than to remove the fabric from the fabric receiving cavity, and thereby combats unintended dislodgement of the fabric from the fabric receiving cavity.

BRIEF DESCRIPTION OF THE DRAWINGS

The foregoing and other objects, aspects, and advantages will be better understood from the following detailed description of the preferred embodiments of the invention with reference to the drawings, in which.

DETAILED DESCRIPTION

Figure 1:
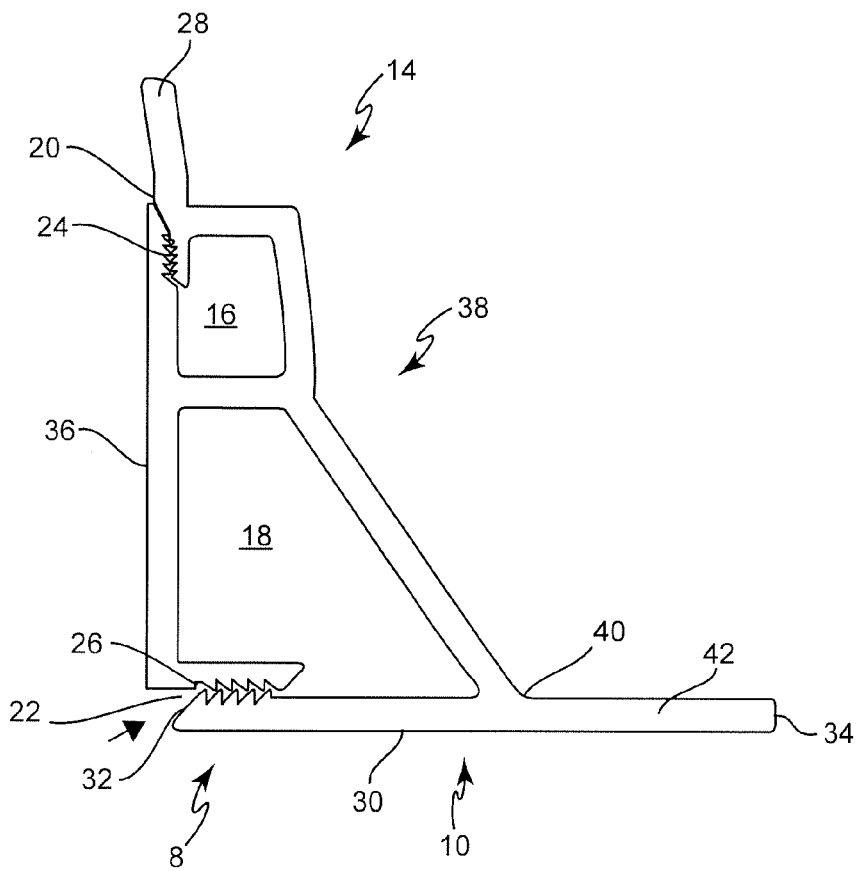
FIG. 1 is a cross-sectional side view of a fabric panel molding according to an embodiment of the invention.

FIG. 1 shows the cross-section of a molding strip 8 for fabric wall and ceiling systems according to an embodiment of the invention. The molding strip 8 comprises a base 10 and a protruding portion 14 which extends from the base 10. The base 10 is securable to a substrate such as a wall, ceiling, or other surface onto which a stretch fabric panel will be created. The protruding portion 14 contains two collection cavities, 16 and 18. Collection cavity 16 has an entry tuck point 20 to permit insertion of material and a gripping member 24 for gripping the material after it is inserted into the collection cavity 16. Entry tuck point 20 is located towards a protruding end 28 of protruding portion 14. The collection cavity 18 has an entry tuck point 22, adjacent to base 10, and a gripping member 26. Collection cavity 18 is positioned adjacent to the base 10 while collection cavity 16 is spaced away from said base by collection cavity 18.

As shown, gripping members 24 and 26 include a plurality of fabric gripping teeth; however, alternative gripping configurations can be employed. It is preferred that the teeth in the fabric gripping regions 24 and 26 have points which are directed towards a central region on an elongated side of teeth on the opposing gripping region as shown in U.S. Pat. No. 5,953,873 to Livingston which is herein incorporated by reference. Alternative teeth arrangements including interlocking teeth as are shown in U.S. Pat. Nos. 5,117,598 and 5,214,892 to Livingston, each of which are hereby incorporated by reference, could also be used on the fabric panel molding strip 8. Other types of gripping members may also be used The longitudinal dimension of the molding strip 8 (into the paper) can be any desired length from, for example, a few inches to several feet. The height of the protruding member 14 from the base 10 can vary depending on the application. For example, in many aesthetic or acoustic applications, the protruding member can be 0.5" to 5" in height, and will often be 1" to 3" in height. If speakers or acoustic fill or board is to be placed behind the fabric, the protruding member 14 will preferably be high enough above the base to allow covering the speakers or acoustic fill or board without having to stretch over top of the speakers or acoustic board.

The molding strip is preferably made from extruded plastic, such as, for example, polyvinylchloride, polypropylene, or polyethylene as stated in U.S. Pat. No. 5,953,873 to Livingston.

The base 10 has a base wall 30 and has opposing side edges, 32 and 34. A side wall 36 extends generally perpendicularly from base wall 30 from side edge 32. For example, depending on the application, the side wall 36 may form an 80° to 100° angle with base wall 30. As depicted, it forms an approximately 90° angle with base wall 30.

A web member 38 preferably connects the base wall 30 to the side wall 36. The web member 38 preferably connects to the base wall 30 at a connection point 40 between opposing side edges 32 and 34 with the collection cavities 16 and 18 positioned between the side wall 36 and the connection point 40, and with an extending member 42 extending beyond the connection point 40. The extending member 42 can be used to secure the molding strip to the substrate with tacks, screws, nails, glue, etc. Alternatively, screws could pass directly through the web 38 and base wall 30 into the substrate.

The collection cavity 18 has an entry point 22 between the side wall 36 and the base wall 30. The collection cavity 16 has an entry point 20 between the side wall 36 and the web member 38. Web member 38 preferably includes a protruding end 28 which protrudes in alignment with the protruding end of the side wall 36, and the entry point 20 between the side wall 36 and the web member 38 is located between the top portion of the side wall 36 and the protruding end 28 of the web member 38.

Figure 2:
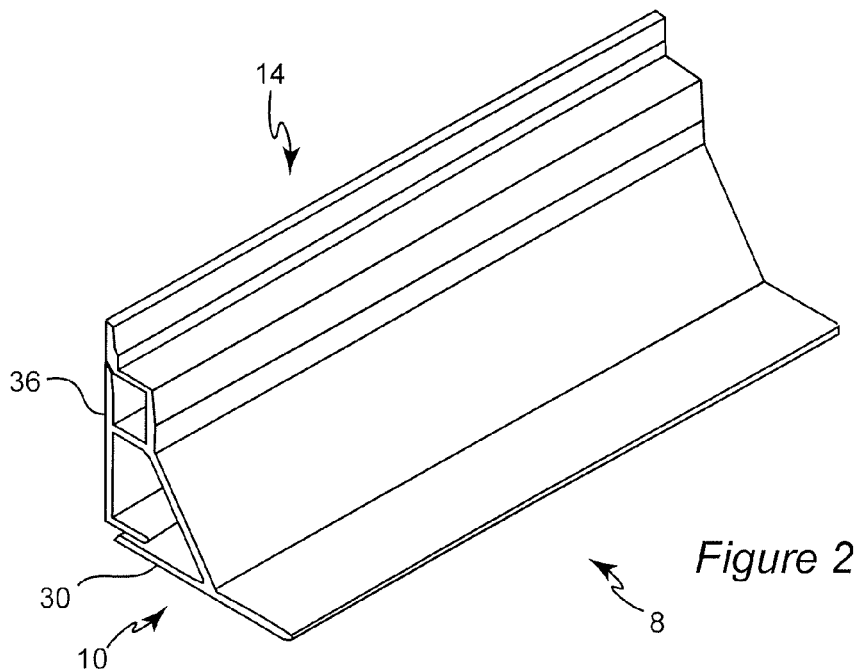
FIG. 2 is an isometric view of the fabric panel molding according to an embodiment of the invention.

FIG. 2 shows a perspective view of molding strip 8 according to FIG. 1. The molding strip 8 has a base 10 which is substantially flat and a protruding portion 14 which are both elongated, as shown in FIG. 2. A back side of the base portion 10, the base wall 30, is placed against a wall or other surface to which the molding strip 8 is to be attached. If the molding strip 8 is being attached to an intersection of a wall and a perpendicular surface, the back side of said base portion is attached to the wall or other surface and the side wall 36 is placed abutting against the perpendicular surface.

Figure 3:
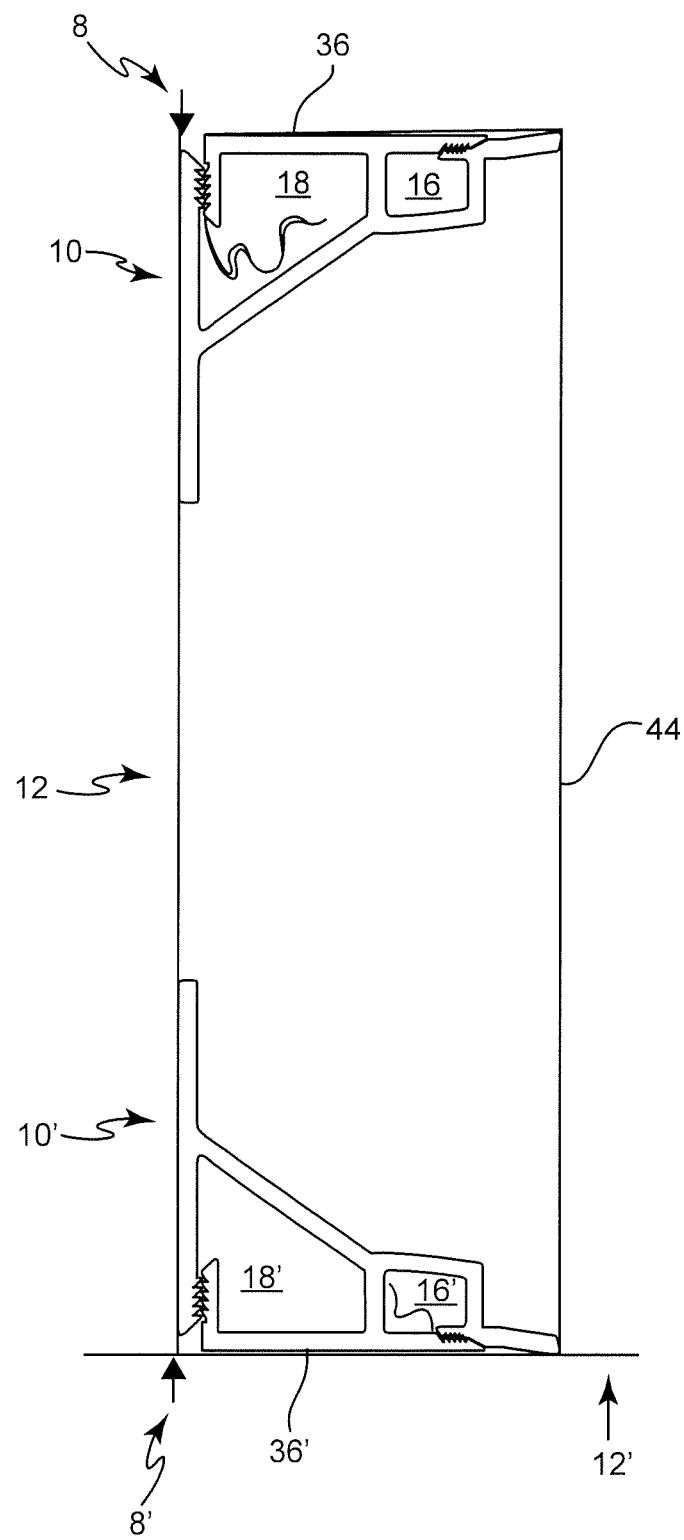
FIG. 3 is a cross-sectional side view of a fabric panel molding and its mirror image when a material is connected between the two moldings according to an embodiment of the invention. On the left side, a fabric material is inserted in a first collection cavity close to the base. On the right side, the fabric material is inserted into a collection cavity spaced away from the base. The left side arrangement is preferably used when the molding strip does not abut against a ceiling or side wall, while the right side arrangement is used when the molding strip abuts against a ceiling or side wall.

FIG. 3 shows a cross sectional side view of a fabric panel molding and its mirror image when a material 44 is stretched between the two moldings according to an embodiment of the invention. The fabric material 44 will typically be a woven cloth, and can be patterned with designs or be of a solid color, and can have rough or smooth texture, depending on the architectural requirements for the space receiving the treatment. In addition, as discussed above, in acoustic treatment applications or in applications where speakers are positioned behind the fabric material 44 it will be desirable to have a fabric material 44 which allows free passage of air to the sound attenuating materials (e.g., fibrous or foam materials). The base 10 and 10' of each molding strip 8 and 8' is attached to a substrate 12. A material 44 is inserted into collection cavity 18 then wrapped around the side wall 36 and inserted in the lower tuck point, conversely, in molding strip 8' which is, for example, in contact with the perpendicularly adjacent substrate 12' (e.g. wall, ceiling, etc.), material 44 cannot be received by collection cavity 18' due to interference by substrate 12'. Rather, the material 44 is inserted in the collection cavity 16' to complete the connection between the molding strips 8 and 8'. Since the material 44 is stretched around the molding strip 8 to the collection cavity 18, and is inserted in the collection cavity 16', the decorative design of the said material is presented as complete and smooth without any harm to the material.

Figure 4:
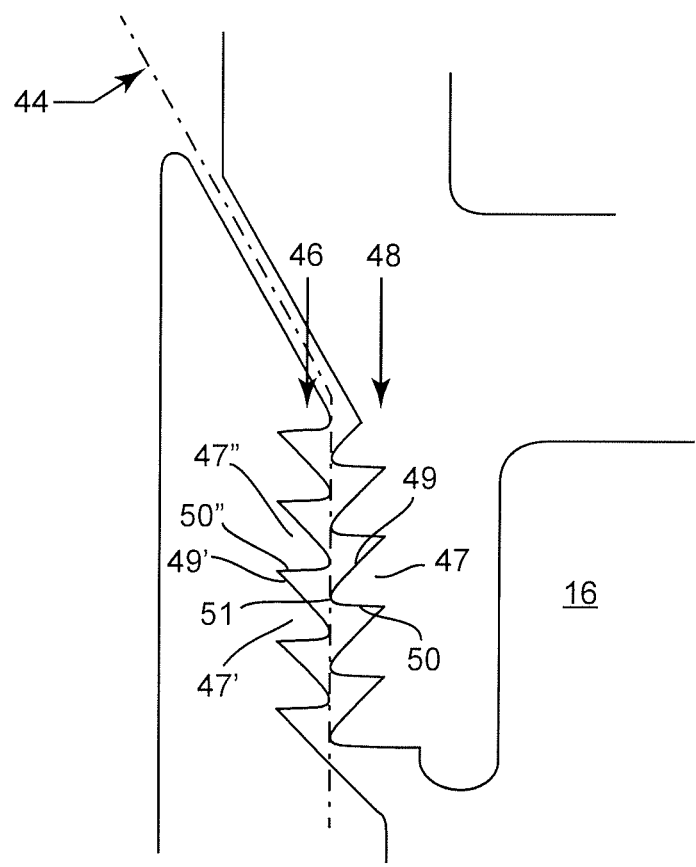
FIG. 4 is a cross-sectional, enlarged view of a material being inserted between the gripping teeth according to an embodiment of the invention.

FIG. 4 shows an example of opposing gripping sections 46 and 48 with a preferred configuration for the gripping teeth on gripping member 24. Each tooth 47 has a long side 49 and a short side 50. The short side 50 projects approximately perpendicular or normal to the gripping section 46 or 48, such that the point 51 of the tooth 47 is directed downward and is closer to the fabric collecting cavity 16 than the base of the long side 49. The point 51 is directed towards a central region of the long side 49' of an opposing tooth 47' and serves to trap and retain fabric (not shown) between the point 51 and the long side 49'. In some applications it may be desirable to have the point 51 contact the long side 49'; however, having a small gap which is preferably smaller than the fabric to be inserted into fabric collection cavity 16 may provide for ease in stuffing the fabric into the cavity 16 between gripping sections 46 and 48. Fabric retention can be enhanced by having a relatively sharp point 51, as is shown in FIG. 4. However, the pressure fit between the point 51 and long side 49' is responsible for resistance to fabric dislodgement from cavity 16; therefore, having rounded or squared off points can also provide to be advantageous within the practice of this invention. In the preferred embodiment, the angle created by the long side 49 and short side 50 of the tooth 47 (or by planes passing through the long side 49 and short side 50 of the tooth 47) ranges between 35 degrees and 55 degrees, and is most preferably 45 degrees. This provides for the creation of a small gap or cavity between the point 51 of tooth 47 and the short side 50" of tooth 47" in which fabric material can bunch up and be securely held.

I claim:

1. A molding strip for fabric wall and ceiling systems, comprising:
    a frame having a base connectable to a substrate and a protruding portion which extends from said base;
    at least two collection cavities in said protruding portion for collecting fabric, said at least two collection cavities share a common wall or web member, and each of said collection cavities include an entry tuck point moveable from a closed position to an opened position to permit insertion of fabric, and a multi-toothed gripping member for gripping fabric inserted into said each of said collection cavities;
    at least a first collection cavity of said at least two collection cavities is positioned adjacent said base and said first collection cavity has a first entry tuck point adjacent said base;
    at least a second collection cavity of said at least two collection cavities is spaced away from said base by said first collection cavity, and said second collection cavity has a second entry tuck point; and
    said first entry tuck point and said second entry tuck point open generally perpendicular to one another.

2. The molding strip of claim 1 wherein said frame includes a base wall having opposing side edges;
    a side wall extending from said base wall generally perpendicular to said base wall from a first edge of said opposing edges; and
    a web member connecting said base wall to said side wall.

3. The molding strip of claim 2 wherein said web member connects to said base wall at a connection point between opposing side edges with said at least two collection cavities positioned between said side wall and said connection point and with an extending member which extends beyond said connection which permits securing said frame to said substrate.

4. The molding strip of claim 2 wherein said first collection cavity has said entry tuck point between said side wall and said base wall.

5. The molding strip of claim 2 wherein said second collection cavity has said entry tuck point between said side wall and web member.

6. The molding strip of claim 5 wherein said web member includes a top portion which protrudes in alignment with a protruding end of said side wall, and said entry tuck point between said side wall and said web member is located between said top portion and said protruding end of said side wall.

7. The molding strip of claim 2
    wherein said first collection cavity has said entry point between said side wall and said base wall, wherein said second collection cavity has said entry point between said side wall and said web member,
    wherein said web member includes a top portion which protrudes in alignment with a protruding end of said side wall, and said entry point between said side wall and said web member is located between said top portion and said protruding end of said side wall, and wherein said web member connects to said base wall at a connection point between opposing side edges with said at least two collection cavities positioned between said side wall and said connection point and with an extending member which extends beyond said connection point which permits securing said frame to said substrate.

\* \* \* \* \*